United States Patent
Sao et al.

(10) Patent No.: US 8,045,516 B2
(45) Date of Patent: Oct. 25, 2011

(54) BASE STATION, MOBILE COMMUNICATION SYSTEM, AND MOBILE COMMUNICATION CONTROL METHOD

(75) Inventors: Tomoki Sao, Yokohama (JP); Shinya Tanaka, Yokohama (JP); Hiroyuki Ishii, Yokosuka (JP); Takehiro Nakamura, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 937 days.

(21) Appl. No.: 11/911,597

(22) PCT Filed: Apr. 14, 2006

(86) PCT No.: PCT/JP2006/307948
§ 371 (c)(1),
(2), (4) Date: Feb. 1, 2008

(87) PCT Pub. No.: WO2006/112399
PCT Pub. Date: Oct. 26, 2006

(65) Prior Publication Data
US 2009/0061874 A1    Mar. 5, 2009

(30) Foreign Application Priority Data
Apr. 14, 2005   (JP) .................................. 2005-117389

(51) Int. Cl.
*H04W 4/00* (2009.01)
*G06F 11/00* (2006.01)
*H04L 12/28* (2006.01)
*H04J 3/16* (2006.01)

(52) U.S. Cl. ......... 370/329; 370/252; 370/431; 370/464

(58) Field of Classification Search ................... 370/252, 370/329, 331, 464, 465; 455/464, 465
See application file for complete search history.

(56) References Cited

U.S. PATENT DOCUMENTS

| | | | |
|---|---|---|---|
| 5,436,956 A | 7/1995 | Shiotsuki et al. | |
| 6,954,651 B2 * | 10/2005 | Yamato | 455/509 |
| 7,822,044 B2 * | 10/2010 | Lee et al. | 370/400 |
| 2002/0147020 A1 * | 10/2002 | Iguchi et al. | 455/452 |
| 2003/0139186 A1 * | 7/2003 | Igarashi et al. | 455/438 |
| 2005/0030964 A1 * | 2/2005 | Tiedemann et al. | 370/431 |
| 2005/0111430 A1 * | 5/2005 | Spear et al. | 370/345 |
| 2005/0141477 A1 | 6/2005 | Tomita et al. | |
| 2005/0207374 A1 | 9/2005 | Petrovic et al. | |

(Continued)

FOREIGN PATENT DOCUMENTS

CN    1669350    9/2005

(Continued)

OTHER PUBLICATIONS

"3rd Generation Partnership Project; Technical Specification Group Radio Access Network; Physical layer procedures (FDD) (release 5)", 3GPP TS 25.214 V5.10.0, Dec. 2004, pp. 1-64.

(Continued)

*Primary Examiner* — Warner Wong
(74) *Attorney, Agent, or Firm* — Oblon, Spivak, McClelland, Maier & Neustadt, L.L.P.

(57) ABSTRACT

A target base station transmits a traffic assignment signal a plurality of times to a control station for notifying a traffic amount of downlink data that can be processed by the target base station, after a notified cell change timing in which the mobile station changes a communicating base station.

4 Claims, 4 Drawing Sheets

U.S. PATENT DOCUMENTS

2006/0116156 A1* 6/2006 Haseba et al. ................ 455/525

FOREIGN PATENT DOCUMENTS

| EP | 1 432 262 A1 | 6/2004 |
| EP | 1 545 143 A1 | 6/2005 |
| JP | 6-38268 | 2/1994 |
| JP | 2004-236029 | 8/2004 |
| JP | 2004-349779 | 12/2004 |
| WO | WO 2004/030396 A1 | 4/2004 |
| WO | WO 2004/057887 A1 | 7/2004 |

OTHER PUBLICATIONS

Office Action issued Nov. 16, 2010 in JP Application No. 2007-526860 (With English Translation).

3GPP TR 25.931 V6.1.0, 3rd Generation Partnership Project; Technical Specification Group RAN; UTRAN Functions, Examples on Signalling Procedures (Rlease 6), Mar. 2005, pp. 56-57, 95-96.

* cited by examiner

BASE STATION, MOBILE COMMUNICATION SYSTEM, AND MOBILE COMMUNICATION CONTROL METHOD

TECHNICAL FIELD

The present invention relates to a base station, a mobile communication system and a mobile communication control method.

BACKGROUND ART

Currently, mobile communication system provides service by segmenting an entire service area into a plurality of radio zones each referred to as a "cell". In a case where a mobile station moves across different cells in the mobile communication system, a "cell change" is performed. In a "cell change," the mobile station changes a communicating base station with which the mobile station performs radio communication (e.g., see Non-patent literature 1).

At the time of the cell change, a control station controlling the base station switches the paths for downlink data, where the destination of downlink data transmission is switched from a source base station to a target base station. In addition, the target base station transmits, to the control station, a traffic assignment signal, which is a notification of a processable traffic amount of the target base station. According to the notified traffic amount, the control station transmits downlink data to the target base station.

However, the switching of paths requires a long period of time in cases, such as when processing load in the control station is high. During the switching of the paths, the control station is unable to process a traffic assignment signal transmitted from the target base station. For this reason, in some cases the control station fails to transmit, to the target base station, downlink data according to the processable traffic amount of the base station. Thus, a "non-communication" state occurs, where no communication is made.

Conventionally, two methods have been employed in order to release this non-communication state.

In one method, the base station retransmits the traffic assignment signal in a case where downlink data is not transmitted from the control station after elapse of a predetermined period of time.

In the other method, the control station transmits, to the base station, a request signal requesting for the traffic assignment signal, in a case where the control station has not received the traffic assignment signal from the base station after elapse of a predetermined period of time. Thereafter, the base station retransmits the traffic assignment signal in response to the request signal.

However, although being capable of releasing the non-communication state, the conventional methods are incapable of preventing the non-communication state from lasting for a certain period of time.

Hence, in order to allow a control station to smoothly process the traffic assignment signal and to accordingly reduce the non-communication period even when the switching of paths requires a long period of time, conceivable methods are: one in which a base station constantly transmits the traffic assignment signal at a high frequency; and another in which a control station constantly transmits request signals requesting for a traffic assignment signal at a high frequency.

However, the use of these methods have caused new problems, such as increase of the load for signal processing in the base station and in the control station, and loss of communication resource between the base station and the control station. Non-patent Literature 1: 3GPP TS25.214 v5.10.0 (2004-12)

DISCLOSURE OF THE INVENTION

Hence, the present invention aims to prevent, when a mobile station changes a communicating base station with which the mobile station performs a radio communication, increase of a load in a base station and in a control station, and loss of communication resource between the base station and the control station, and hence, to allow the control station to smoothly process a control signal from the base station.

A base station according to the present invention is including: a control signal generating unit configured to generate a control signal for a control station configured to control the base station; a control signal communication unit configured to transmit the control signal a plurality of times to the control station, when a mobile station changes a communicating base station with which the mobile station performs a radio communication.

According to such a base station, even in a case where the control station requires a long period of time for switching the paths, since the control signals can be transmitted to the control station a plurality of times, the control station can immediately receive the control signal from the base station after the switching of the paths, and promptly process the signal.

Additionally, since the base station transmits the control signals a plurality of times only when a mobile station changes a communicating base station with which the mobile station performs the radio communication, an increase of a load in the base station and in the control station, and loss of communication resource between the base station and the control station can be prevented.

The control signal communication unit may receive, from the control station, a notification of a change timing at which the mobile station changes the communicating base station, and to transmit the control signal the plurality of times after the notified change timing.

According to this base station, increase of load and loss of communication resource can be more surely prevented, because the plurality of transmission of the control signals can be more surely limited to the necessary timings.

The control signal generating unit may generate, as the control signal, a traffic assignment signal for notifying the control station of a traffic amount of downlink data which can be processed by the base station.

According to this base station, even in a case where a long period of time is required for switching the paths, the control station can immediately receive the traffic assignment signal from the base station after the switching of the paths, and promptly transmit downlink data of the amount according to the processable traffic amount of the base station. Hence, the non-communication period can be reduced.

The control signal communication unit may terminate the transmission of the traffic assignment signal, when the downlink data is transmitted from the control station to the mobile station.

According to this base station, processing load and loss of communication resource can be further suppressed.

The control signal communication unit may shorten a transmission interval of the control signal in an initial stage of the transmission, and to lengthen the transmission interval to more than the transmission interval in the initial stage, in accordance with time passage.

According to this base station, the traffic assignment signals can be processed more promptly because of the shortened transmission interval, in a case where the switching of the paths is completed in an initial stage of the transmission. Moreover, transmission of needless control signals can be reduced because of the lengthened transmission interval, in a case where the switching of the paths requires a long period of time. Thus, processing load and loss of communication resource can be further suppressed.

The mobile communication system according to the present invention including: a control station configured to control a base station; and the base station configured to transmit a control signal a plurality of times to the control station, when a mobile station changes a communicating base station with which the mobile station performs a radio communication.

The mobile communication control method according to the present invention including: transmitting, at a base station, a control signal a plurality of times to a control station configured to control the base station, when a mobile station changes a communicating base station with which the mobile station performs a radio communication.

BEST MODES FOR CARRYING OUT THE INVENTION (Mobile Communication System)

Figure 1:
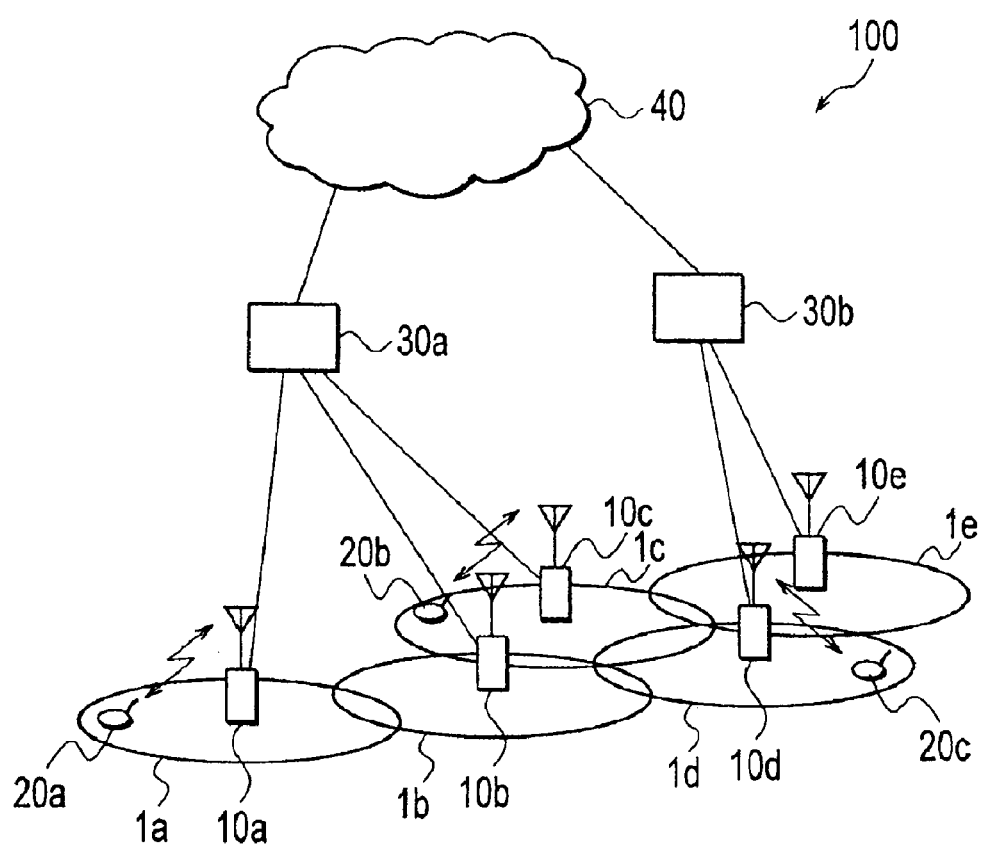
FIG. 1 is a diagram showing a configuration of a mobile communication system according to an embodiment of the present invention.

As shown in FIG. 1, a mobile communication system 100 includes a plurality of base stations 10a to 10e, a plurality of mobile stations 20a to 20c, a plurality of control stations 30a and 30b, and a core network 40.

The mobile communication system 100 provides a mobile communication service by dividing the entire service area into a plurality of radio zones. Specifically, a plurality of cells 1a to 1e exists as the plurality of radio zones, in the mobile communication system 100.

The mobile stations 20a to 20c each set a radio channel (a radio network) with the base station covering the cell in which the mobile station is, and perform radio communication.

The base stations 10a to 10e cover the cells 1a to 1e, respectively. The base stations 10a to 10e each set radio channels with the mobile stations locating the cell among the cells 1a to 1e covered by the respective base stations, and perform radio communication.

The control stations 30a and 30b control the base station. The control station 30a is connected to each of the base stations 10a to 10c through a wire, and the control station 30b is connected to each of the base stations 10d and 10e through a wire. The control station 30a has centralized control over the plurality of base stations 10a to 10c, and the control station 30b has centralized control over the plurality of base stations 10d and 10e. Moreover, the control stations 30a and 30b are connected to the core network 40. The core network 40 includes an exchange and the like.

Data transmission between the mobile stations 20a to 20c and the core network 40 is performed via the control stations 30a and 30b and the base stations 10a to 10e. Thus, the mobile communication system 100 is configured so that each of the core network 40, the control stations 30a and 30b, and the base stations 10a to 10e form steps.

Figure 2:
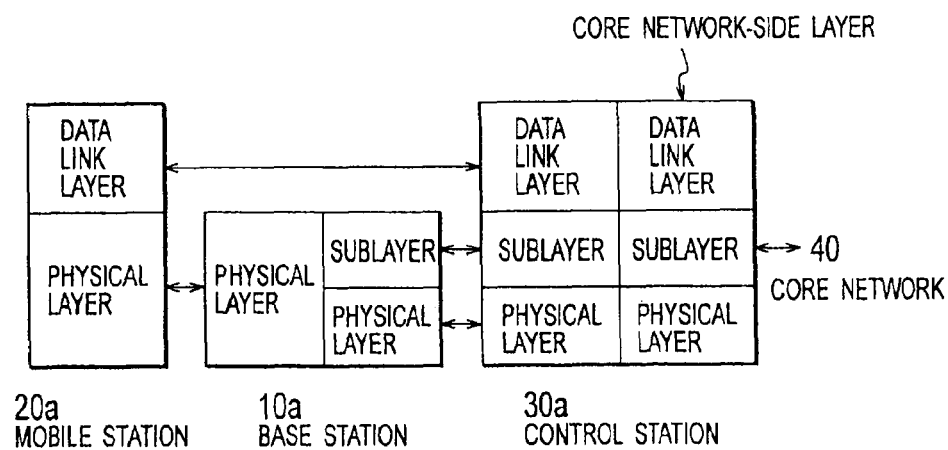
FIG. 2 is a diagram showing a protocol stack of the mobile communication system according to the embodiment of the present invention.

A protocol stack of the mobile communication system 100 will be shown in FIG. 2.

The mobile station 20a is provided with a physical layer facing the base station 10a and performing communication with the base station 10a. Additionally, the mobile station 20a is provided with a data link layer facing the control station 30a and performing communication with the control station 30a.

The base station 10a is provided with the physical layer facing the mobile station 20a and performing communication with the mobile station 20a. Additionally, the base station 10a is provided with a physical layer and a sublayer facing the control station 30a and performing communication with the control station 30a.

The control station 30a is provided with a physical layer and a sublayer facing the base station 10a and performing communication with the base station 10a. Additionally, the control station 30a is provided with the data link layer facing the mobile station 20a and performing communication with the mobile station 20a. The control station 30a is also provided with core network-side layers facing the core network 40 and performing communication with the core network 40. The core network-side layers include a physical layer, a sublayer and a data link layer.

The sublayer is specifically a sublayer of an AAL (ATM adaptation layer). For example, control information, such as a transmission rate, is exchanged in the sublayer between the base station 10a and the control station 30a. In addition, the mobile stations 20b and 20c, the base stations 10b to 10e, and the control station 30b are provided with the same protocol stacks.

Figure 3:
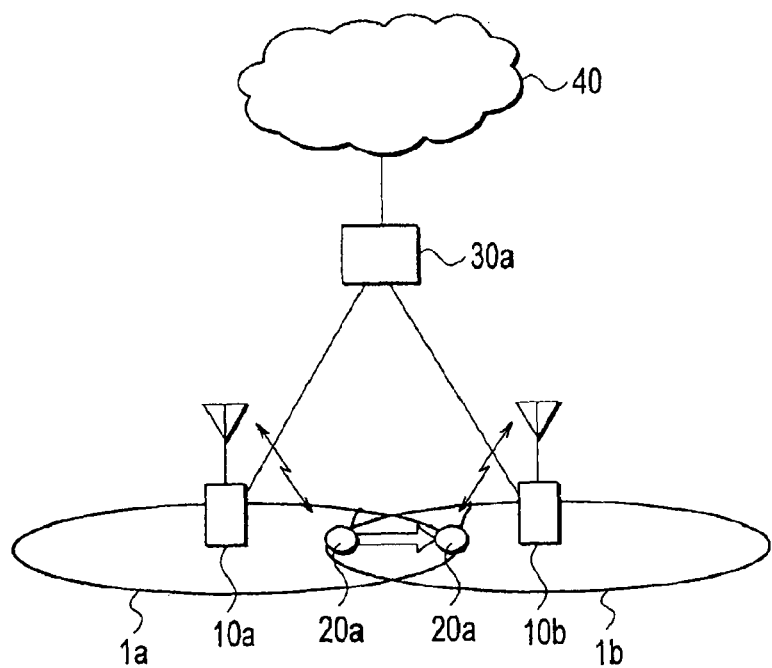
FIG. 3 is a diagram showing a cell change according to the embodiment of the present invention.

In the mobile communication system 100 as shown in FIG. 3, in some cases, the mobile station 20a moves across different cells 1a and 1b during communication. At this time, the mobile station 20a performs a "cell change", where a base station to perform radio communication with is switched during the communication.

Specifically, the mobile station 20a switches the connection with the base station 10a covering the cell 1a, to a connection with the base station 10b covering the cell 1b to which the mobile station 20a has moved. Then, the mobile station 20a establishes a radio channel with the base station 10b, and then performs radio communication.

Here, processing in the base stations 10a and 10b and the control station 30a at the cell change will be explained by focusing on control signals in the cell change.

Firstly, the control station 30a notifies the source base station 10a and the target base station 10b of a change timing of the cell change.

A change timing of the cell change is the timing at which the mobile station 20a changes a communicating base station to perform radio communication with, from the source base station 10a to the target base station 10b.

The control station 30a transmits, to the source base station 10a and the target base station 10b, a cell change control signal for notification of a change timing of the cell change.

Upon receipt of the cell change control signal, the source base station 10a requests, before the notified cell change timing, the control station 30a to stop the downlink data transmission from the control station 30a to the source base station 10a.

The base stations 10a and 10b notify of control information related to transmission (data traffic) of downlink data from the control station 30a to the base stations 10a and 10b, by use of the "traffic assignment signal", which is a control signal.

Accordingly, the base station 10a transmits, to the control station 30a, a traffic assignment signal requesting to stop the transmission of downlink data (to stop the data traffic).

The control station 30a switches, at the notified cell change timing, the paths for downlink data, where the destination of downlink data transmission is switched from the source base station 10a, to the target base station 10b.

Moreover, after the notified cell change timing, the target base station 10b notifies the control station 30a of the traffic amount of downlink data that the base station 10b can process.

The base station 10b transmits, to the control station 30a, a traffic assignment signal for notification of the processable traffic amount of downlink data.

The control station 30a transmits downlink data to the base station 10b according to the traffic amount notified by the target base station 10b.

In the mobile communication system 100, the control station 30a thus controls the traffic amount of downlink data to the base station 10a and 10b, at the cell change.

At the such a cell change in a case where the mobile station 20a changes the communicating base station with which the mobile station 20a performs a radio communication, the target base station 10b transmits a "traffic assignment signal", which is a control signal, a plurality of times to the control station 30a.

Specifically, by regarding the notified cell change timing as a starting point, the base station 10b transmits the traffic assignment signal a plurality of times to the control station 30a, after the notified cell change timing.

Thereafter, upon transmission of downlink data from the control station 30a to the mobile station 20a, the base station 10b terminates transmission of the traffic assignment signal.

Next, a more detailed explanation on configurations of the base stations 10a to 10e and the control stations 30a and 30b will be provided.

Figure 4:
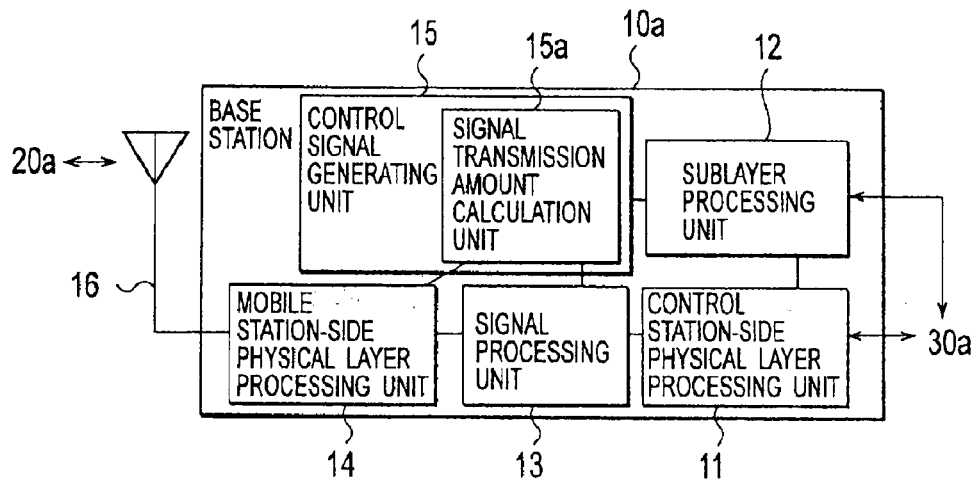
FIG. 4 is a block diagram showing a configuration of a base station according to the embodiment of the present invention.

As shown in FIG. 4, the base station 10a includes a control station-side physical layer processing unit 11, a sublayer processing unit 12, a signal processing unit 13, a mobile station-side physical layer processing unit 14, a control signal generating unit 15 and an antenna 16. The base stations 10b to 10e are provided with the same configuration as that of the base station 10a.

The control station-side physical layer processing unit 11 performs communication with the control station 30a in the physical layer. The control station-side physical layer processing unit 11 performs communication by connecting to the control station 30a through a wire. The control station-side physical layer processing unit 11 transmits uplink data from the mobile station 20a to the control station 30a, and receives downlink data to the mobile station 20a form the control station 30a.

The sublayer processing unit 12 performs communication with the control station 30a in the sublayer. The sublayer processing unit 12 is a control signal communication unit configured to transmit to control station 30a and receive from the control station 30a, control signals including control information.

The sublayer processing unit 12 transmits to and receives from the control station 30a, control signals, such as a cell change control signal which is a notification of a cell change timing, a traffic assignment signal which is a notification of a traffic amount in the downlink, and a traffic assignment signal which is a request to stop the transmission (to stop the data traffic) of downlink data and the like.

When a base station which is including the sublayer processing unit 12 becomes the target base station at a cell change, the sublayer processing unit 12 transmits traffic assignment signal a plurality of times to the control station 30a for notifying the control station 30a of a traffic amount of downlink data which can be processed by the base station. Here, in the cell change, the mobile station 20a changes a communicating base station with which the mobile station performs a radio communication.

Firstly, the sublayer processing unit 12 receives a cell change control signal from the control station 30a, the cell change control signal being a notification of a cell change timing at which the mobile station 20a changes the communicating base station.

Then, the sublayer processing unit 12 transmits a traffic assignment signal, which are notifications of traffic amount, a plurality of times to the control station 30a, after the notified cell change timing.

The sublayer processing unit 12 can terminate transmission of the traffic assignment signal, when the downlink data is transmitted from the control station 30a to the mobile station 20a.

In this way, increase of the load for signal processing in the base station 1a and in the control station 30a, and loss of communication resource, such as a wired bandwidth between the base station 10a and the control station 30a, can be further prevented.

The control station-side physical layer processing unit 11 notifies the sublayer processing unit 12 of the reception of downlink data. Upon receipt of the notification from the control station-side physical layer processing unit 11, the sublayer processing unit 12 detects the transmission of downlink data from the control station 30a, and can terminate transmission of the traffic assignment signal.

For example, the switching of paths may require a long period of time in cases, such as when processing load in the control station 30a is high. The control station 30a is unable to process a traffic assignment signal transmitted from the target base station during the switching of the paths. For this reason, the control station 30a fails to transmit, to the target base station, downlink data in accordance with the processable traffic amount of the base station, leading to the occurrence of a non-communication state.

Hence, in a case where the time required for switching the paths becomes so long that downlink data is not transmitted from the control station 30a after the passage of the cell change timing, the sublayer processing unit 12 transmits the traffic assignment signal a plurality of times.

Meanwhile, in a case where downlink data are immediately transmitted from the control station 30a in response to the traffic assignment signal which the sublayer processing unit 12 firstly transmitted, the sublayer processing unit 12 can terminate transmission of the traffic assignment signal with a single transmission.

The sublayer processing unit 12 may transmit the traffic assignment signal a plurality of times at certain transmission intervals, or may vary the transmission intervals instead of certain intervals.

For example, the sublayer processing unit 12 is able to shorten the transmission interval of the traffic assignment signal in the initial stage of the transmission, and then to lengthen the interval to more than the transmission interval in the initial stage, in accordance with time passage.

In this way, the traffic assignment signal can be processed more promptly because of the shortened transmission intervals, in a case where the switching of the paths is terminated in an initial stage of the transmission. As a result, the non-communication period can be made even shorter.

Moreover, transmission of needless the traffic assignment signal can be reduced because of the elongated intervals, in a case where the switching of the paths require a long period of time. As a result, increase of the load for signal processing in the base station 10a and in the control station 30a, and loss of communication resource, such as a wire bandwidth between the base station 10a and the control station 30a, can be suppressed even more.

In a case of transmitting the traffic assignment signal at certain intervals, the sublayer processing unit 12 is capable of setting appropriate transmission intervals in consideration of both the prevention of increase of a load and loss of communication resource, and the prompt processing of the traffic assignment signal and reduction of a non-communication period attributed thereto.

When a base station which is including the sublayer processing unit 12 becomes the source base station at a cell change, the sublayer processing unit 12 transmits, to the control station 30a, a traffic assignment signal requesting to stop the transmission of downlink data (to stop the data traffic).

The signal processing unit 13 performs relay processing of control signals and data between the mobile station 20a and the control station 30a. Moreover, the signal processing unit 13 performs buffering and the like of data transmitted and received between the mobile station 20a and the control station 30a.

The mobile station-side physical layer processing unit 14 performs communication with the mobile station 20a in the physical layer. The mobile station-side physical layer processing unit 14 establishes a radio channel with the mobile station 20a. Thereafter, the mobile station-side physical layer processing unit 14 performs radio communication with the mobile station 20a through the antenna 16. The mobile station-side physical layer processing unit 14 transmits to and receives from the mobile station 20a, downlink data to the mobile station 20a and uplink data from the mobile station 20a.

The control signal generating unit 15 is a control signal generation unit configured to generate a control signal for the control station 30a. The control signal generating unit 15 generates, as a control signal, a traffic assignment signal notifying the control station 30a of a traffic amount of downlink data which can be processed by the base station 10a, and a traffic assignment signal requesting to stop the transmission of downlink data (to stop the data traffic).

The control signal generating unit 15 is provided with a signal transmission amount calculation unit 15a.

The signal transmission amount calculation unit 15a calculates a traffic amount of downlink data that the base station 10a can process, that is, the amount of downlink data that the control station 30a can transmit to the base station 10a (a signal transmission amount from the control station).

The signal transmission amount calculation unit 15a monitors the mobile station-side physical layer processing unit 14 to measure a traffic amount of downlink data that the base station 10a transmits to the mobile station 20a (a signal transmission amount from the base station).

The signal transmission amount calculation unit 15a monitors the signal processing unit 13 to measure the amount of retained data for the mobile station 20a in the base station 10a. That is, the signal processing unit 13 measures the amount of buffered downlink data to the mobile station 20a.

Then, the signal transmission amount calculation unit 15a calculates a traffic amount of downlink data that the base station 10a can process, on the basis of: the maximum traffic amount of downlink data that the base station 10a can process, that is, the maximum traffic amount (maximum signal transmission amount) that the control station 30a can transmit to the base station 10a; a measured value of a traffic amount of downlink data transmitted from the base station 10a to the mobile station 20a (a signal transmission amount from the base station); and a measured value of the amount of retained data in the base station 10a.

For example, the signal transmission amount calculation unit 15a estimates the time period that the data is retained in the buffer, by dividing a measured value of the amount of retained data in the base station 10a by a measured value of a traffic amount of downlink data transmitted from the base station 10a to the mobile station 20a (a signal transmission amount from the base station). Then, on the basis of the estimated time period of the data being retained in the buffer, the signal transmission amount calculation unit 15a calculates a traffic amount of downlink data that the base station 10a can process (a signal transmission amount from the control station).

Otherwise, the signal transmission amount calculation unit 15a may calculate the maximum traffic amount that the control station 30a can transmit to the base station 10a (the maximum signal transmission amount), as a traffic amount of downlink data that the base station 10a can process (a signal transmission amount from the control station).

Additionally, for example, the signal transmission amount calculation unit 15a calculates a traffic amount of downlink data that the base station 10a can process (a signal transmission amount from the control station), by subtracting, from the maximum traffic amount (maximum signal transmission amount), a measured value of a traffic amount of downlink data transmitted from the base station 10a to the mobile station 20a and a measured value of the amount of retained data in the base station 10a.

The control signal generating unit 15 generates a "traffic assignment signal," which is a control signal, including, as control information, a traffic amount of downlink data that the base station 10a can process determined by the signal transmission amount calculation unit 15a. The control signal generating unit 15 inputs the generated traffic assignment signal to the sublayer processing unit 12.

Figure 5:
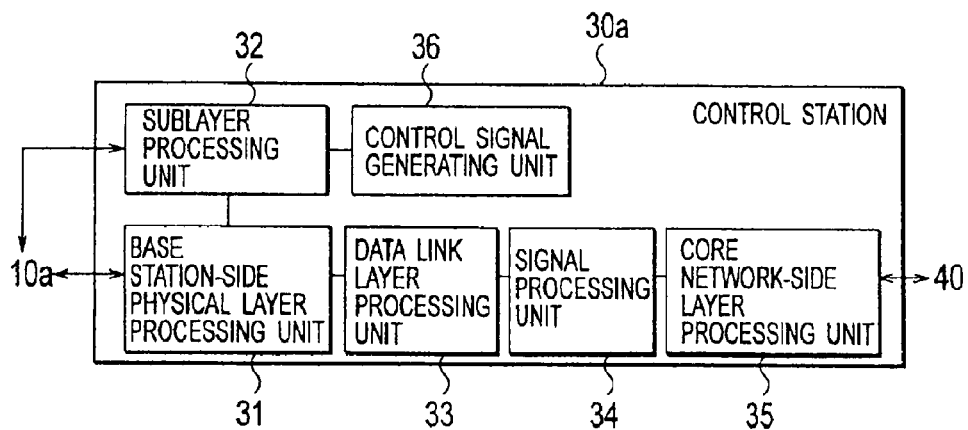
FIG. 5 is a block diagram showing a configuration of a control station according to the embodiment of the present invention.

As shown in FIG. 5, the control station 30a includes a base station-side physical layer processing unit 31, a sublayer processing unit 32, a data link layer processing unit 33, a signal processing unit 34, a core network-side layer processing unit 35 and a control signal generating unit 36. The control station 30b is provided with the same configuration as that of the control station 30a.

The base station-side physical layer processing unit 31 performs communication with the base station 10a in the physical layer. The base station-side physical layer processing unit 31 performs communication by connecting to the base station 10a through a wire. The base station-side physical layer processing unit 31 transmits to the base station 10*a* and receives from the base station 10*a*, downlink data to the mobile station 20*a* and uplink data from the mobile station 20*a*. Moreover, at the time of a cell change, the base station-side physical layer processing unit 31 switches the paths for downlink data, where the destination of downlink data transmission is switched from a source base station to a target base station.

The sublayer processing unit 32 performs communication with the base station 10*a* in the sublayer. The sublayer processing unit 32 transmits and receives control signals to and from the base station 10*a*. The sublayer processing unit 32, for example, transmits to the base station 10*a* and receives from the base station 10*a*, control signals, such as a cell change control signal and a traffic assignment signal.

Moreover, the sublayer processing unit 32 performs control related to transmission (data traffic) of downlink data from the control station 30*a* to the base stations 10*a* and 10*b*, according to the received traffic assignment signal. In addition, the sublayer processing unit 32 instructs the base station-side physical layer processing unit 31 to switch the paths at the cell change timing.

In a case where the traffic assignment signal is for requesting to stop transmission of downlink data (stop data traffic), the sublayer processing unit 32 instructs the base station-side physical layer processing unit 31 to stop transmission of downlink data to the source base station that is the transmission source of the traffic assignment signal.

In a case where the traffic assignment signal is for notifying the control station 30*a* of a traffic amount of downlink data that can be processed by the base station, the sublayer processing unit 32 instructs the base station-side physical layer processing unit 31 to transmit downlink data according to the notified amount, to the target base station that is the transmission source of the traffic assignment signal.

The control signal generating unit 36 generates a control signal for the base station 10*a*. The control signal generating unit 36 generates a cell change control signal and the like as a control signal. The control signal generating unit 36 inputs the generated control signal to the sublayer processing unit 32.

The data link layer processing unit 33 performs communication with the mobile station 20*a* in the data link layer. The data link layer processing unit 33 transmits to and receives from the mobile station 20*a*, data and control signals through the base station-side physical layer processing unit 31 and the base station 10*a*.

The signal processing unit 34 performs relay processing of control signals and data between the mobile station 20*a* and the core network 40. In addition, the signal processing unit 34 performs buffering and the like of data transmitted and received between the mobile station 20*a* and the core network 40.

The core network-side layer processing unit 35 performs communication with the core network 40. The core network-side layer processing unit 35 performs communication by connecting to the core network 40 through a wire. The core network-side layer processing unit 35 transmits to and receives from the core network 40, downlink data to the mobile station 20*a* and uplink data from the mobile station 20*a*.

(Mobile Communication Control Method)

Next, a mobile communication control method of the mobile communication system 100 will be explained with reference to FIG. 6. Specifically, a procedure at the cell change as illustrated in FIG. 3 will be shown.

Firstly, the control station 30*a* transmits a cell change control signal for notification of a cell change timing to the source base station 10*a* and the target base station 10*b* (S101*a*, S101*b*).

Upon receipt of the cell change control signal, the source base station 10*a* transmits to the control station 30*a*, before the notified cell change timing, a traffic assignment signal requesting to stop transmission of downlink data (stop data traffic) from the control station 30*a* to the source base station 10*a* (S102).

At the notified cell change timing (S103), the control station 30*a* switches the paths for downlink data, where the destination of downlink data is switched from the source base station 10*a* to the target base station 10*b* (S104).

Moreover, after the notified cell change timing (S103), the target base station 10*b* transmits a traffic assignment signal for notification of a traffic amount of downlink data which can be processed by the base station 10*b*, a plurality of times to the control station 30*a* (S105*a* to S105*d*).

Figure 6:
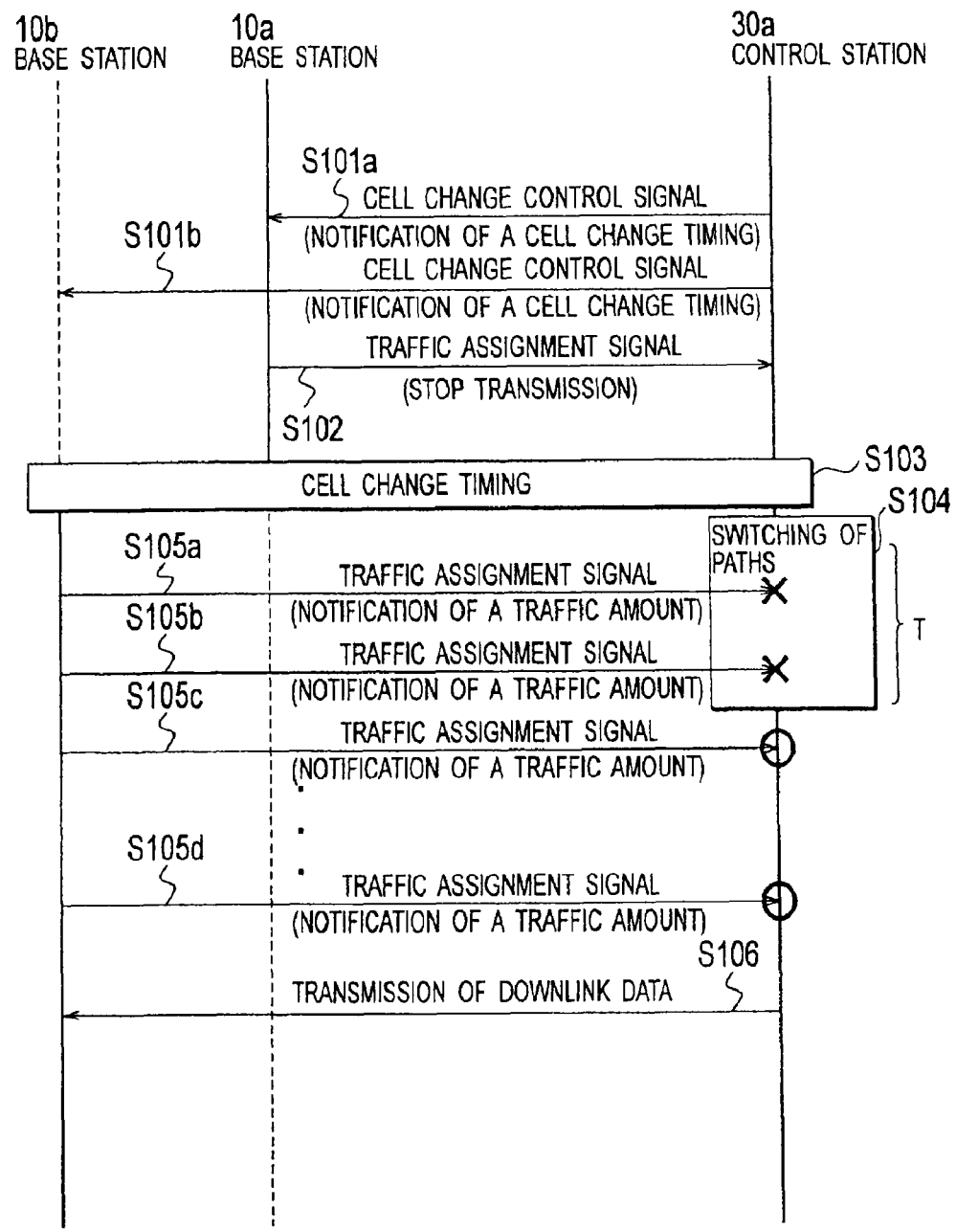
FIG. 6 is a sequence diagram showing a procedure of a mobile communication control method according to the embodiment of the present invention.

As shown in FIG. 6, when the processing load in the control station 30*a* is so high that a required time period T for switching the paths becomes long, the control station 30*a* is unable to process a traffic assignment signal during the switching of the paths.

In other words, the control station 30*a* is unable to process the traffic assignment signals transmitted in steps (S105*a*) and (S105*b*).

Thereafter, when the switching of the paths is completed, the control station 30*a* is able to process the traffic assignment signal.

In other words, the control station 30*a* is able to process the traffic assignment signal transmitted in steps (S105*c*) and (S105*d*).

Then, according to the traffic assignment signal, the control station 30*a* transmits downlink data according to the processable traffic amount of the base station 10*b* (S106). Upon transmission of downlink data from the control station 30*a* to the mobile station 20*a*, the base station 10*b* terminates transmission of the traffic assignment signal.

(Effects)

According to such mobile communication system 100, base stations 10*a* to 10*e* and mobile communication control method, since the target base station can transmit the traffic assignment signal a plurality of times to the control stations 30*a* and 30*b* at the cell change, the control stations 30*a* and 30*b* can immediately receive the traffic assignment signal from the target base station and promptly process the signals after completion of switching of paths, even when the switching of the paths requires a long period of time.

More specifically, the control stations 30*a* and 30*b* can promptly transmit, based on the received traffic assignment signal, downlink data in accordance with the processable traffic amount of the target base station. Hence, the non-communication period can be reduced, even in a case where the switching of the paths takes such a long time and the switching of the paths has been completed after passing a long period of time from the cell change.

Moreover, since the base stations 10*a* to 10*e* transmit the traffic assignment signal a plurality of times only when the mobile stations 20*a* to 20*c* change a communicating base station with which the mobile station performs the radio communication, an enlargement of loads in the base stations 10*a* to 10*e* and in the control station 30*a* and 30*b*, and loss of communication resource, such as wire bandwidths between the base stations 10*a* to 10*e* and the control stations 30*a* and 30*b*, can be prevented.

In particular, by transmitting the traffic assignment signal a plurality of times after the cell change timing, the base stations 10a to 10e can more surely limit the plurality of transmissions of traffic assignment signal to the necessary timings. As a result, increase of load and loss of communication resource can be more surely prevented.

It should be noted that the present invention is not limited to the above-mentioned embodiment, and various modifications are possible.

INDUSTRIAL APPLICABILITY

As has been described, according to the present invention, an increase of a load in a base station and in a control station, and loss of communication resource between the base station and the control station can be prevented when a mobile station changes a communicating base station with which the mobile station performs a radio communication, whereby the control station can promptly process a control signal from the base station.

The invention claimed is:

1. A base station comprising:
a control signal communication unit configured to receive, from a control station, a notification of a change timing at which a mobile station changes a communicating base station; and
a control signal generating unit configured to generate a traffic assignment signal for notifying the control station of a traffic amount of downlink data which can be processed by the base station, wherein
the control signal communication unit is configured to transmit the traffic assignment signal a plurality of times to the control station after the notified change timing, shorten a transmission interval of the traffic assignment signal in an initial stage of the transmission, and lengthen the transmission interval to more than the transmission interval in the initial stage in accordance with time passage.

2. The base station according to claim 1, wherein the control signal communication unit is configured to terminate the transmission of the traffic assignment signal when downlink data is transmitted from the control station to the mobile station.

3. A mobile communication system comprising:
a control station configured to control a base station; and
the base station configured to:
receive, from the control station, a notification of a change timing at which a mobile station changes a communicating base station;
generate a traffic assignment signal for notifying the control station of a traffic amount of downlink data which can be processed by the base station; and
transmit the traffic assignment signal a plurality of times to the control station after the notified change timing, wherein
the base station is configured to shorten a transmission interval of the traffic assignment signal in an initial stage of the transmission and lengthen the transmission interval to more than the transmission interval in the initial stage in accordance with time passage.

4. A mobile communication control method comprising:
receiving, at a base station from a control station, a notification of a change timing at which a mobile station changes a communicating base station;
generating, at the base station, a traffic assignment signal for notifying the control station of a traffic amount of downlink data which can be processed by the base station; and
transmitting, at the base station, the traffic assignment signal a plurality of times to a control station after the notified change timing, wherein the transmitting includes shortening a transmission interval of the traffic assignment signal in an initial stage of the transmission and lengthening the transmission interval to more than the transmission interval in the initial stage in accordance with time passage.

* * * * *